Dec. 7, 1965 G. C. ANDERSON 3,221,943
CONTAINER WITH VALVE OPERATED NOZZLE
Filed Oct. 16, 1963 2 Sheets-Sheet 2
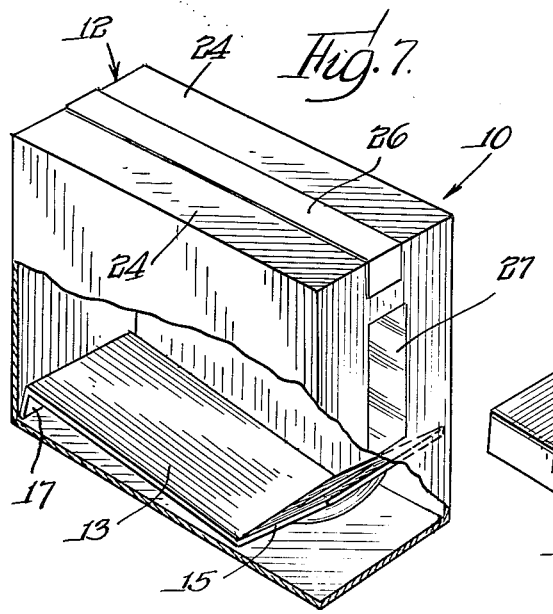
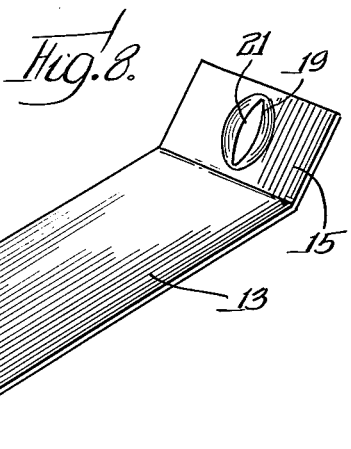
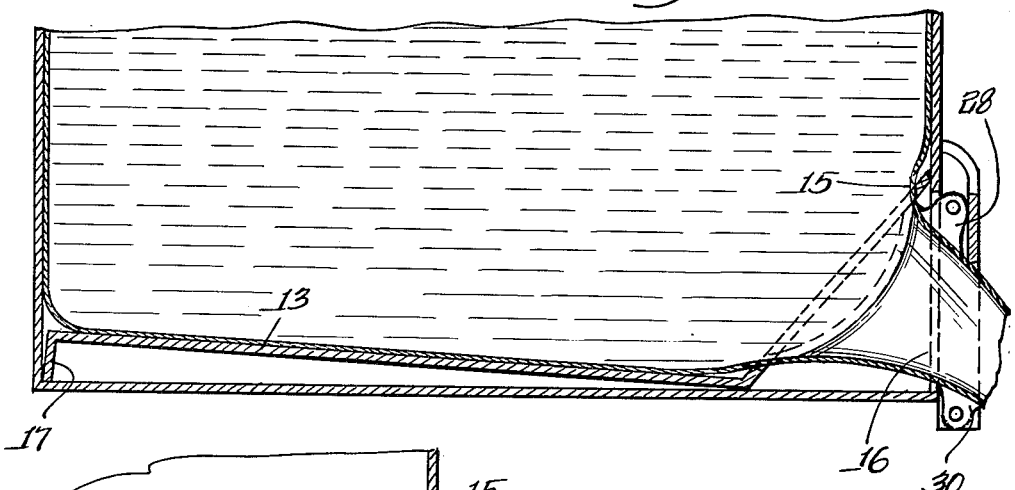
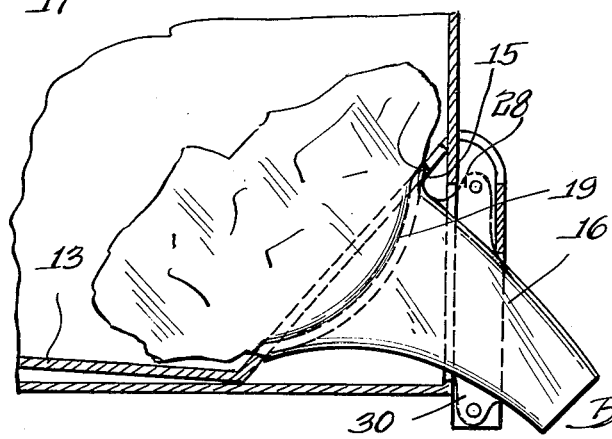
INVENTOR.
George C. Andersen

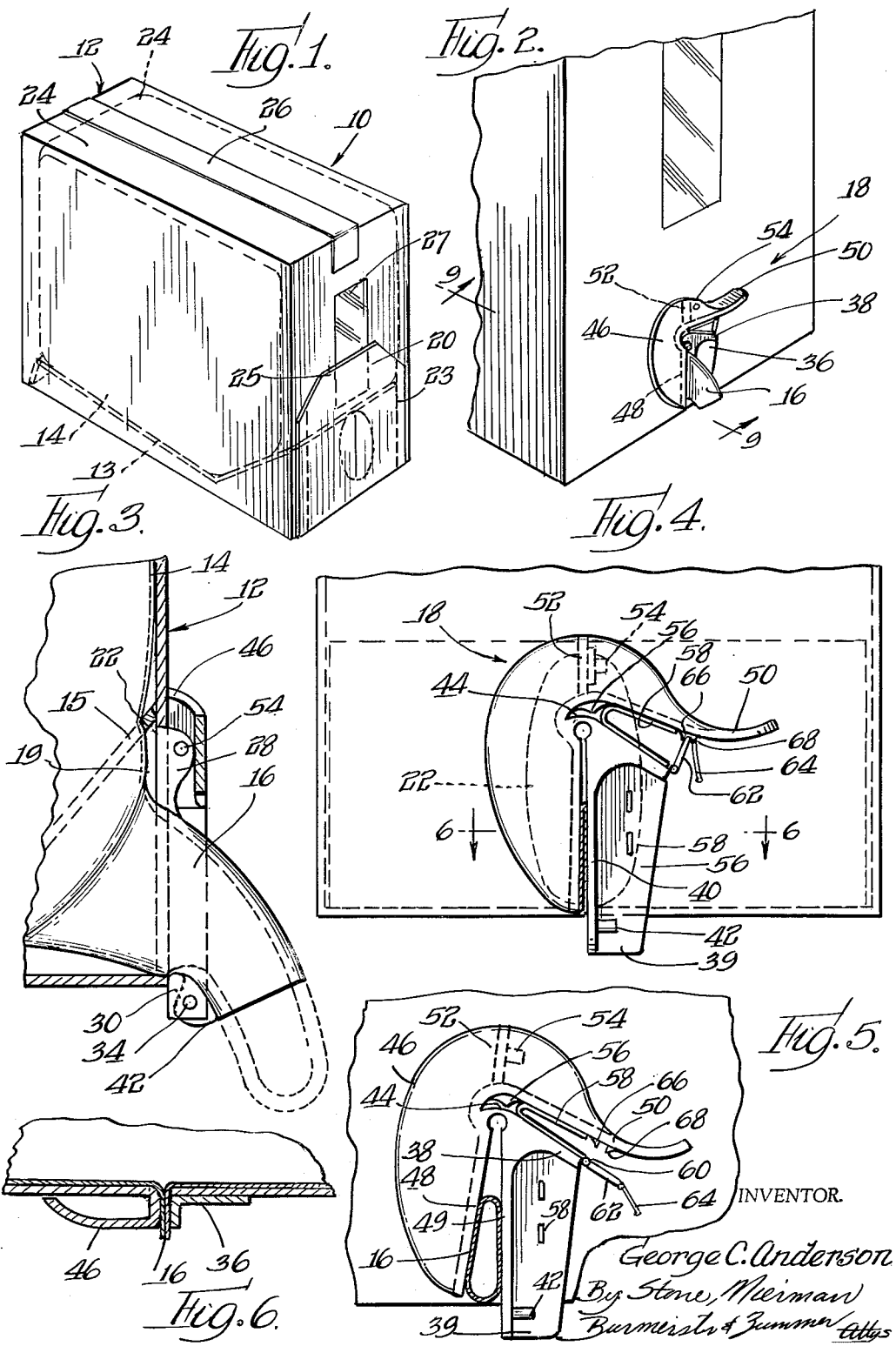

United States Patent Office 3,221,943
Patented Dec. 7, 1965

3,221,943
CONTAINER WITH VALVE OPERATED NOZZLE
George C. Anderson, 2423 Main St., Evanston, Ill.
Filed Oct. 16, 1963, Ser. No. 316,625
20 Claims. (Cl. 222—183)

This invention relates to a container, and more particularly to a container which is capable of storing and dispensing liquids, but which container with its dispensing apparatus is made of inexpensive materials and is inexpensive to manufacture so that it is disposable.

Many liquids such as milk are traditionally sold to customers in glass containers or jugs. In recent years, the advantage of disposable containers has been recognized in the dairy industry. However, there is a size limitation which has prevented the use of a disposable container for milk, inasmuch as the container must be handled by a housewife, or in many instances by children. In order to provide economies in the distribution of milk, it is desirable to provide a container which may hold a gallon or more of milk, and which container also has a means for conveniently dispensing milk from the container, so that a housewife or child may withdraw a desired quantity of milk without lifting the container for each withdrawal. Various dispensing devices are available. However, all of these dispensing devices are expensive in that a substantial investment must be made in order to provide a control mechanism for dispensing milk. Furthermore, it may be readily appreciated that the problem of keeping a device clean over a protracted period of time is also a problem for a housewife. It is therefore a principal object of the herein disclosed invention to provide an inexpensive container which has a simple and inexpensive dispensing device as a part of the container, which dispensing device and container may be discarded when all of the milk is withdrawn from the container.

It is a further object of the present invention to provide a container which has a dispensing device which is sanitary and requires no care or cleaning on the part of the housewife.

It is another object of this invention to provide a container which has a dispensing device attached to the container so that the dispensing device may be readily and conveniently used.

It is a still further object of the instant invention to provide an inexpensive valve construction which may be fixed to a shell of a container for controlling the flow of liquid from a thin film bag positioned in the shell and which bag holds milk.

Other objects and uses of the herein disclosed invention will become readily apparent to those skilled in the art upon a perusal of the following specification in light of the accompanying drawing, in which:

FIGURE 1 is a perspective view of a container embodying the present invention with a seal on the container covering a valve and nozzle portion;

FIGURE 2 is a perspective view of a portion of the container shown in FIGURE 1, but with the seal removed in order to show a valve and nozzle portion of the instant invention;

FIGURE 3 is a cross-sectional view of a dispensing portion of the container shown in FIGURE 2;

FIGURE 4 is a side elevation of the valve shown in FIGURES 2 and 3 shown in a closed attitude;

FIGURE 5 is a side elevation similar to FIGURE 4, but showing the valve in an open position;

FIGURE 6 is a cross-sectional view taken on line 6—6 of FIGURE 4;

FIGURE 7 is a perspective view of the container shown in FIGURE 1 with portions broken away in order to show better the internal construction of the container;

FIGURE 8 is a perspective view of a floor and retaining wall member;

FIGURE 9 is a cross-sectional view taken on line 9—9 of FIGURE 2; and

FIGURE 10 is a fragmentary cross-sectional view similar to FIGURE 9 but showing the container empty.

Referring now to the drawings, it may be seen that a container generally indicated by numeral 10 and embodying the herein disclosed invention is shown therein. The container 10 generally consists of a substantially rigid shell 12 with a rigid floor 13 and retaining wall 15 in the shell and a thin film bag 14 positioned in the container in engagement with the floor and retaining wall. The thin film bag includes a nozzle portion 16 which is engaged by a valve 18 to control the flow of fluid through the nozzle portion. A seal 20 is fixed to the rigid shell 12 to cover the valve and nozzle portion in order to protect the valve and to keep the valve and nozzle portion sanitary. The seal is a strip of paper which has its edges 21 and 23 fixed to the shell by an adhesive. The upper portion of the seal is a tab portion 25 which provides a convenient means for grasping the upper portion of the seal.

The shell 12 is a conventional cardboard container which has four walls or sides, a bottom formed integral with the sides and a dispensing aperture 22 in one side. The construction of the cardboard shell is conventional in that it includes a pair of outer flaps 24 which are formed integral with a pair of opposite sides and the flaps are sealed closed by a piece of adhesive tape 26 to form a top. The container has a window 27 in one wall of the container above valve 18 to provide a means for viewing the interior of the container to determine the quantity of milk remaining.

As was mentioned above, floor 13 and retaining wall 15 are positioned in the shell. The floor includes a rise 17 which is formed integral with the floor and is positioned adjacent to the wall of the shell which is opposite the wall having the dispensing aperture so that the floor slopes downward toward the valve 18. The retaining wall is formed integral with the opposite edge of the floor and is in engagement with the wall having the dispensing aperture so that the retaining wall slopes upward. The retaining wall has a depression or nest 19 in its central portion with an elongated slot 21 in the nest.

Positioned within the rigid outer shell is the bag 12. The bag 12 is made of a thin film polyethylene material which in this instance is the preferred material. It may be appreciated that any other suitable material may be used though polyethylene is the most suitable. The bag 14, as was mentioned above, includes a nozzle portion 16 which partially rests in nest 19, extends through slot 21 and aperture 22 and is in engagement with valve 18. The nozzle portion 16 is sealed closed in its manufacture as is shown in dotted form in FIGURE 3, and it has a pair of ears 28 and 30 formed integral therewith. The ears 28 and 30 contain mounting holes 32 and 34, respectively, for reasons which will become apparent hereinafter.

As was mentioned above, the valve 18 is fixed to the shell 24. The valve 18 has a body made of a single piece of molded polypropylene. It should be noted that other products, such as, polyethylene or nylon may be used instead of polypropylene though polypropylene is preferred. The valve includes a base 36 which has a spring wall 38 formed integral with one end. Formed integral with the other end of the base is an extension tab 39 which extends below the bottom of shell 12 to provide a catch or brake for the container which is engageable with a refrigerator shelf for positioning the container. A flat jaw 40 is also formed integral with the base, and a pin 42 is formed integral with the flat jaw.

At the juncture of the spring wall 38 and the jaw 40, a hinge section 44 is formed integral therewith. A carrier section 46 is formed integral with the opposite end of the hinge section, so that the carrier section may move relative to the base. A second flat jaw 48 is formed integral with the carrier section 46, and the flat jaw 48 is mateable with the flat jaw 40. Formed integral with the carrier section is a handle 50 which handle provides a convenient means for operating the valve. A wall 52 is formed integral with the carrier section, and a second pin 54 is formed integral with the wall. A spring stop 56 is formed integral with the handle adjacent to the hinge section. Positioned between the handle and the spring wall is a generally U-shaped leaf spring 58 which tends to urge the jaws toward each other to place the jaws in a closed relationship.

As was mentioned above, the valve 18 is fixed to the shell adjacent to the aperture 22. In this instance, a staple 58 is driven through the wall of the shell and through the base 36 to fix the base to the shell. It may be noted that the base may be fixed to the shell by other means, such as an adhesive or other convenient fastening means.

Valve 18 has a closing lock formed integral therewith. A lock hinge 60 is formed integral with the end of spring wall 38 and a lock bar 62 is formed integral at one end with the lock hinge to be hingedly connected to the spring wall. Formed integral with the other end of the lock bar is a lock tab 64 which provides a convenient means for grasping and releasing the lock bar. A pair of lock protuberances 66 and 68 are formed integral with handle 50. Lock protuberance 66 serves a dual function in that it also acts as a stop for spring 58. It is evident that the lock bar may be snapped into position between the protuberances 66 and 68 to hold the lock bar in position and to hold the jaws in a closed attitude to seal closed nozzle 16.

The instant container is used in the following manner. First the shell is assembled, and the thin film bag 14 is positioned in the shell with the nozzle portion positioned in slot 21 and aperture 22 and between the jaws 40 and 48 to close off a portion of the nozzle portion. The ears on the nozzle portion are then attached to the valve. Pin 54 is positioned in hole 32 of ear 28 and pin 42 is positioned in hole 34 of ear 30. The coaction of the pins with the ears provides a convenient means for holding the nozzle in the valve. Next, the valve is stapled to the shell by means of staple 58. The valve is then locked closed by snapping the lock bar into position between the lock protuberances.

With the nozzle portion in position, the seal 20 is then affixed to the shell to cover the valve and nozzle portion. Thus, the valve and nozzle portion are protected from damage and from becoming soiled. Milk is then introduced into the bag 14. After an appropriate quantity of milk is introduced into the bag, the bag is then sealed by some convenient method, such as, heat sealing. The flaps 24 are then closed, and the tape 26 is applied to seal close the shell. It is evident that the container is then ready to be delivered to a customer.

Once the container is delivered to a customer, it is a simple matter for a housewife to remove the contents. Under ordinary conditions, she would place the container in her refrigerator on a shelf with the valve facing the refrigerator door and the tab 39 engages the shelf to keep the nozzle in a position for ready use. She need only tear off the seal 20 by grasping the tab portion and pulling down to expose the valve and nozzle portion. The next step is to snip off a portion of the nozzle portion. It may be appreciated that during handling, the handle may be jarred, but the lock keeps the jaws closed. The valve is unlocked by the housewife by grasping the lock tab and snapping the lock bar out of engagment with the protuberances to release the carrier section. FIGURE 3 shows the nozzle portion in an uncut attitude in dotted form. However, after the seal is opened and the valve is unlocked, the housewife cuts off that portion of the nozzle which is shown in dotted form to allow milk to flow through the nozzle. Once the nozzle is opened, the valve 18 is used to control the flow of liquid out of the bag. In order to dispense milk, the handle 50 is pushed down so that the handle moves against the spring 58, thereby pivoting the carrier section on hinge section 44 relative to the base 36. In this manner, the jaw 48 is moved away from jaw 40 to allow the liquid to flow out of the nozzle. When the force is relased from handle 50, the spring 58 moves the jaws together to seal closed the thin film nozzle. As was mentioned above, the ears 28 and 30 are attached to the valve at pins 42 and 54. Thus, the nozzle is held between the valve jaws.

It may be appreciated that the nozzle is a thin film of material and any misalignment of the jaws 40 and 48 would allow the nozzle to leak, which would be disastrous in a home refrigerator. Since the valve body is made of a single molded piece of material, the alignment of the jaws is always perfect. It can be appreciated that the valve may be very inexpensively produced, since once the mold is manufactured, the alignment of the jaws is always the same as that in the mold. Thus, there is always perfect alignment and the valve is always operative.

As the bag empties, the nest and slot construction in the retaining wall prevents the bag from folding on itself to close off the nozzle portion. The slope of floor 13 also insures the emptying of the entire contents of the bag without tilting the shell. It may be thereby appreciated that the cooperation of the floor and the retaining wall allows easy complete emptying of the bag so that it finally assumes the attitude generally shown in FIGURE 10.

From the foregoing description it is apparent that the instant container is inexpensive to manufacture. The valve is a single molded valve body with a leaf spring positioned in the valve body. The shell and floor and retaining wall members are made of cardboard, and the bag is an inexpensive thin film material. It is readily apparent that the entire container is inexpensive to produce, and may be conveniently disposed by a housewife.

Although specific steps and specific materials were set forth in the foregoing description, it is readily apparent that those skilled in the art may make various modifications and changes, such as, in the method of filling the container, the specific design of the container, the specific use of materials, and specific construction of the valve, without departing from the spirit and scope of the present invention. It is to be expressly understood that the instant invention is limited only by the appended claims.

What is claimed is:

1. A container for storing liquids comprising, in combination, a substantially rigid outer shell, a thin film bag positioned within the shell for holding a liquid in the bag, a valve mounted on the shell and receiving a portion of the thin film bag for controlling the flow of liquid out of said bag, and a cover mounted on the shell and covering said valve to protect said valve.

2. A container for storing and dispensing liquids comprising, in combination, a substantially rigid outer shell, a thin film bag positioned within the shell for holding a liquid, and a valve having a single piece moulded body mounted on the shell and engaging a portion of the bag for controlling the flow of liquid out of the bag.

3. A container for storing liquids comprising, in combination, a substantially rigid shell, a valve mounted on the exterior of said shell, a thin film bag mounted in the shell for containing a liquid therein, said bag having a nozzle portion extending through the rigid shell and being engageable with the valve to have the flow of liquid through said nozzle portion be controlled by said valve, and a cover fixed to said shell covering the valve and a portion of the nozzle portion of the bag.

4. A container for storing and dispensing liquids comprising, in combination, a substantially rigid cardboard outer shell, a thin film polyethylene bag positioned within the shell for holding a liquid, a valve having a single piece moulded body of polypropylene mounted on the shell and engaging a portion of the bag for controlling the flow of liquid out of said bag, and a seal mounted on the shell to protect said valve.

5. A valve for use in closing a thin film nozzle comprising, a unitary moulded body having a base, a first flat jaw formed integral with said base, a flexible hinge section formed integral with said base, a carrier section formed integral with said hinge section and pivotal relative to said base on said hinge section, a second flat jaw formed integral with the carrier section and being mateable with the first flat jaw for sealing closed a thin film nozzle between said jaws, a lock formed integral with said body for locking the jaws in a closed attitude, and a spring positioned between the carrier section and the base for resiliently holding the jaws together.

6. A container for storing and dispensing liquids comprising, in combination, a substantially rigid outer shell having a nozzle aperture container therein, a floor mounted on the bottom of the shell and being inclined toward the nozzle aperture, a retaining wall having a slot mounted in the shell adjacent to the nozzle aperture, a thin film bag for holding liquid in the bag positioned in the shell and resting on the floor and positioned against the retaining wall, said thin film bag having a nozzle portion positioned in the elongated slot of the retaining wall and extended through the nozzle aperture, and a valve engaging the nozzle portion for controlling the flow of liquid therethrough.

7. A valve for use in closing a thin film nozzle comprising, a first flat jaw for engagement with a thin film nozzle, a flexible hinge section formed integral with the first flat jaw, a second flat jaw formed integral with the flexible hinge section and being pivotal relative to the first flat jaw, said second flat jaw being engageable with the thin film nozzle for sealing closed the thin film nozzle between the jaws, a handle formed integral with the second flat jaw for pivoting the second flat jaw relative to the first flat jaw, and a lock formed integral with the first flat jaw and engageable with the handle for holding the jaws together in a closed attitude.

8. A valve for use in closing a thin film nozzle comprising, a first flat jaw for engagement with a thin film nozzle, a flexible hinge section formed integral with the first flat jaw, a second flat jaw formed integral with the flexible hinge section and being pivotal relative to the first flat jaw, said second flat jaw being engageable with the thin film nozzle for sealing closed the thin film nozzle between said jaws, a handle attached to the second flat jaw for pivoting the second flat jaw relative to the first flat jaw, and means for resiliently holding the jaws together to hold the thin film nozzle in a closed attitude.

9. A valve for use in closing a thin film nozzle comprising, a base, a first flat jaw formed integral with said base, a flexible hinge section attached to said base adjacent to one end of said flat jaw, a carrier section formed integral with said hinge section and pivotal relative to said base on said hinge section, a second flat jaw formed integral with the carrier section and being mateable with the first flat jaw for sealing closed a thin film nozzle between said jaws, and means for releasably holding the jaws together.

10. A valve for use in closing a thin film nozzle comprising, a first flat jaw for engagement with a thin film nozzle, a carrier formed integral with said jaw and moveable supporting said jaw, a hinge section formed integral with the carrier, a second flat jaw formed integral with the hinge section and being engageable with a thin film nozzle to seal closed said nozzle between said jaws, a first pin mounted on the carrier for holding a thin film nozzle between the jaw, a second pin formed integral with the second jaw for cooperating with the first-mentioned pin to hold a nozzle between the jaws, a base formed integral with the first jaw and being adapted for attachment to a container, and means for holding the jaws closed to seal closed a thin film nozzle between the jaws.

11. A valve for use in closing a thin film nozzle comprising, a base, a first jaw formed integral with said base, a flexible hinge section formed integral with said base adjacent to one end of said jaw, a carrier section attached to said hinge section and pivotal relative to the base on said hinge section, a second jaw formed integral with the carrier section and being mateable with the first jaw for sealing closed a thin film nozzle between said jaws, and means for releasable holding the jaws together.

12. A valve for use in closing a thin film nozzle, comprising a base adapted to be fixed to a container, a first flat jaw formed integral with said base, a flexible hinge section formed integral with said base adjacent to one end of said flat jaw, a carrier section formed integral with said hinge section and being pivotal relative to the base on said hinge section, a second flat jaw formed integral with the carrier section and being mateable with the first flat jaw for sealing closed a thin film nozzle between said jaws, a handle formed integral with the carrier section for selectively moving the second flat jaw relative to the first flat jaw to control the flow of a fluid through the nozzle between the jaws, and a spring positioned between the handle and the base to urge constantly the jaws into a closed attitude.

13. A container for storing liquids comprising, in combination, a substantially rigid shell having an outlet opening on one side, a base fixed to said shell adjacent to the outlet opening, a first flat jaw formed integral with said base, a flexible hinge section formed integral with said base adjacent to one end of said flat jaw, a carrier section formed integral with said hinge section and pivotal relative to the base on said hinge section, a second flat jaw formed integral with the carrier section and being mateable with the first flat jaw, means for resiliently holding the jaws together, a thin film bag positioned in the shell for holding a liquid therein, said bag having a nozzle portion extending through the opening in said shell and being engageable with the flat jaws to have the flow of fluid controlled by the flat jaws, and means for holding the nozzle portion between the flat jaws.

14. A container for storing and dispensing liquids comprising, in combination, a substantially rigid outer shell, a thin film bag positioned in the shell for holding a liquid, a valve having a single piece moulded body mounted on the shell and engaging a portion of the bag for controlling the flow of liquid out of the bag, and a lock formed integral with the body for releasably locking the valve in a closed attitude.

15. A carton of the character described comprising, a substantially rigid outer shell having a bottom four walls connected to said bottom and a top connected to the upper portion of said walls, one of said walls having a nozzle aperture, a floor mounted on said bottom and sloping downward toward said nozzle aperture, a retaining wall mounted in said shell adjacent to said nozzle aperture and sloping in a direction opposite to the slope of said floor, and said retaining wall having a nest defining an elongated slot adjacent to the nozzle aperture.

16. A container for storing and dispensing liquids, comprising, in combination, a substantially rigid shell having a nozzle aperture contained therein, a floor mounted on the bottom of the shell and being inclined toward the nozzle aperture, a retaining wall having an elongated slot mounted in the shell adjacent to the nozzle aperture and inclined in the direction opposite to the incline of the floor, a thin film bag for holding liquid in the bag positioned in the shell and resting on the floor and positioned against the retaining wall, said thin film bag having a nozzle portion positioned in the elongated slot of the retaining wall and extending through the nozzle aperture, and a valve having a unitary body mounted on the shell and engaging the nozzle portion for controlling the flow of liquid therethrough.

17. A container for storing and dispensing liquids comprising, in combination, a substantially rigid outer shell having a nozzle aperture contained therein, a floor mounted on the bottom of the shell and sloping toward the nozzle aperture, a retaining wall mounted in the shell adjacent to the nozzle aperture and sloping in a direction opposite to the direction of the slope of the floor, said retaining wall having an integral nest defining an elongated slot adjacent to the nozzle aperture, a thin film bag for holding liqud in the bag positioned in the shell and resting on the floor and positioned against the retaining wall, said thin film bag having a nozzle portion partially positioned in the nest of the retaining wall and extending through the elongated slot and the nozzle aperture, a valve having a unitary body mounted on the shell adjacent to the nozzle aperture and engaging the nozzle portion for controlling the flow of liquid therethrough, and a cover mounted on the shell covering the valve and the nozzle portion for protecting said valve and said nozzle portion.

18. A container for storing and dispensing liquids comprising, in combination, a rigid shell having an outlet opening on one side adjacent to the bottom of the shell, a base fixed to said shell adjacent to the outlet opening, a tab formed integral with said base and extended below the bottom of the shell to provide a hook for the container, a first flat jaw formed integral with said base, a flexible hinge section formed integral with said base, a carrier section formed integral with said hinge section and being pivotal relative to the base, a second flat jaw formed integral with the carrier section and being mateable with the first flat jaw, a spring positioned between the base and the carrier section for resiliently holding the jaws together, a thin film bag positioned in the shell for holding a liquid therein, said bag having a nozzle portion extended through the opening in said shell and being engageable with the flat jaws to have the flow of liquid controlled by the flat jaws, and a lock formed integral with said base for releasably locking the jaws in a closed attitude.

19. A container for storing liquids comprising, in combination, a substantially rigid shell having an outlet opening in one side, a base adjacent to the outlet opening, a staple extending through the shell and the base to fix the base to the shell, a first flat jaw formed integral with said base and being positioned over a portion of the outlet opening, a flexible hinge section formed integral with said base adjacent to one end of said flat jaw, a carrier section formed integral with said hinge section and pivotal relative to the base on said hinge section, a second flat jaw formed integral with the carrier section and being mateable with the first flat jaw, a pin formed integral witht he first flat jaw, a second pin formed integral with the carrier section, a handle formed integral with the carrier section, a spring positioned between the handle and the base section to urge the second flat jaw toward the first flat jaw, a thin film bag positioned in the rigid shell for holding a liquid therein, said thin film bag having an integral nozzle portion extending through the opening in the shell and positioned between the flat jaws, a pair of ears formed integral with the nozzle portion and being positioned in engagement with the pins for holding the nozzle portion between the jaws, and a removable cover fixed to the shell for protecting the valve and nozzle portion, whereby the flow of liquid from the bag is controlled by the operation of the jaws against the nozzle portion.

20. A container for storing and dispensing liquids comprising, in combination, a substantially rigid outer shell having a bottom, four walls connected to said bottom and a top connected to the four walls, one of said four walls having a nozzle aperture, a floor mounted on said bottom and sloping downward toward said nozzle aperture, a retaining wall mounted in said shell adjacent to said nozzle aperture and sloping in a direction opposite to the slope of said floor, said retaining wall having a nest defining an elongated slot adjacent to the nozzle aperture, a base fixed to the wall having said nozzle aperture and being positioned adjacent to the nozzle aperture, a tab formed integral with said base and extending below the bottom to provide a hook for the container, a first flat jaw formed integral with said base, a flexible hinge formed integral with said base, a carrier section formed integral with said hinge and being pivotly relative to the base, a second flat jaw formed integral with the carrier section and being mateable with the first flat jaw, a spring positioned between the base and the carrier section for resiliently holding the jaws together, a thin film bag positioned in the shell and resting on the floor and positioned against the retaining wall, said thin film bag having a nozzle portion partially resting against said nest and extending through the elongated slot and the nozzle aperture to be engageable with the flat jaws to have the flow of liquid therethrough controlled by the flat jaws, and a lock formed integral with said base for releasably locking the jaws in a closed attitude.

References Cited by the Examiner
UNITED STATES PATENTS
3,116,854  1/1964  Rabb et al. _____ 222—183

LOUIS J. DEMBO, *Primary Examiner.*

HADD S. LANE, *Examiner.*